(12) United States Patent
Van Heugten

(10) Patent No.: US 12,399,368 B2
(45) Date of Patent: Aug. 26, 2025

(54) NEAR-EYE DISPLAY WITH ARRAY OPTICS

(71) Applicant: e-Vision Smart Optics, Inc., Sarasota, FL (US)

(72) Inventor: Anthony Van Heugten, Sarasota, FL (US)

(73) Assignee: e-Vision Smart Optics, Inc., Sarasota, FL (US)

( * ) Notice: Subject to any disclaimer, the term of this patent is extended or adjusted under 35 U.S.C. 154(b) by 532 days.

(21) Appl. No.: 17/837,437

(22) Filed: Jun. 10, 2022

(65) Prior Publication Data

US 2022/0317457 A1    Oct. 6, 2022

Related U.S. Application Data

(63) Continuation of application No. PCT/US2020/064413, filed on Dec. 11, 2020.
(Continued)

(51) Int. Cl.
*G02B 27/01* (2006.01)
*G02B 26/08* (2006.01)
(Continued)

(52) U.S. Cl.
CPC ..... *G02B 27/0172* (2013.01); *G02B 26/0875* (2013.01); *G02B 27/0075* (2013.01);
(Continued)

(58) Field of Classification Search
CPC ............... G02B 27/01; G02B 27/0103; G02B 27/0101; G02B 27/0149; G02B 27/017;
(Continued)

(56) References Cited

U.S. PATENT DOCUMENTS 9,335,548 B1    5/2016  Cakmakci et al.
2013/0234935 A1*  9/2013  Griffith .............. G02B 27/0093
                                          359/240
(Continued)

FOREIGN PATENT DOCUMENTS

JP    2006091333 A    4/2006
JP    2014130218 A    7/2014
(Continued)

OTHER PUBLICATIONS

Canadian Examiner's Report in Canadian Appl. No. 3, 159,693 dated Jun. 6, 2024, 6 pages.
(Continued)

*Primary Examiner* — Henry Duong
(74) *Attorney, Agent, or Firm* — Smith Baluch LLP

(57) ABSTRACT

Transparent organic light-emitting diodes (OLEDs) can be used as light-emitting pixels in a near-eye display for augmented reality applications. The light from these pixels can be switchably tuned and/or steered with tunable beam-steering and focusing elements, also called tunable micro-lenses. These tunable micro-lenses are arranged in an array and mated to the array of pixels, for example, by embedding in a spectacle lens. The tunable micro-lenses use fast-switching half-wave plates to selectively focus and/or tilt light from the pixels. By switching the light from the pixels between resolvable positions/angles at a rate faster than the flicker fusion threshold (e.g., 60 Hz), the tunable micro-lenses can effectively double the apparent resolution of the near-eye display. And by switching between focusing and non-focusing states at the same rate, the tunable micro-lenses can effectively superimpose the virtual images from the pixels on the real-world image visible through the pixels.

22 Claims, 10 Drawing Sheets

Related U.S. Application Data

(60) Provisional application No. 62/950,707, filed on Dec. 19, 2019, provisional application No. 62/946,498, filed on Dec. 11, 2019.

(51) Int. Cl.
  *G02B 27/00* (2006.01)
  *G02B 27/09* (2006.01)
  *G02B 27/28* (2006.01)

(52) U.S. Cl.
  CPC ....... *G02B 27/0961* (2013.01); *G02B 27/286* (2013.01); *G02B 2027/0178* (2013.01)

(58) Field of Classification Search
  CPC ............ G02B 27/0172; G02B 27/0176; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/015; G02B 2027/0147; G02B 2027/0152; G02B 2027/0154; G02B 2027/0156; G02B 2027/0158; G02B 2027/0159; G02B 2027/0161; G02B 2027/0165; G02B 2027/0163; G02B 2027/0167; G02B 2027/0169; G02B 2027/0174; G02B 2027/0178; G02B 2027/0181; G02B 2027/0183; G02B 2027/0185; G02B 2027/0187; G02B 2027/019; G02B 2027/0192; G02B 2027/0194; G02B 2027/0196; G02B 2027/0198; G02B 26/0875; G02B 27/0075; G02B 27/0961; G02B 27/286; G02B 3/0068; G02B 3/14; G02B 3/0006; G02F 1/294; G02F 1/133528
  USPC ......................................................... 359/630
  See application file for complete search history.

(56) References Cited

U.S. PATENT DOCUMENTS

| | | | | |
|---|---|---|---|---|
| 2015/0277123 | A1* | 10/2015 | Chaum | G09G 3/02 348/62 |
| 2015/0331247 | A1* | 11/2015 | Srivastava | H04N 13/356 349/15 |
| 2017/0059960 | A1 | 3/2017 | Shi et al. | |
| 2019/0107719 | A1* | 4/2019 | Edwin | G09G 3/003 |

FOREIGN PATENT DOCUMENTS

| | | |
|---|---|---|
| WO | 2019173113 A1 | 9/2019 |
| WO | 2019203873 A1 | 10/2019 |

OTHER PUBLICATIONS

European Search Report in European App. No. 20899283.4 dated Jul. 19, 2024, 15 pages.
Office Action with translation in Japanese App. No. 2022-535050 dated Oct. 21, 2024, 12 pages.
Commander et al., "Microlenses immersed in nematic liquid crystal with electrically controllable focal length," in Third European Optical Society 'Microlens Arrays' Topical Meeting, 1995, 7 pages.
International Search Report and Written Opinion in International Patent Application No. PCT/US2020/064413 mailed Mar. 18, 2021, 17 pages.
Partial European Search Report in European App. No. 20899283.4 dated Dec. 6, 2023, 15 pages.
Tung et al. "49.3: A 200-dpi Transparent a-Si TFT Active-Matrix Phosphorescent OLED Display." 205 SID Symposium Boston, MA May 24-27, 2005: vol. XXXVI, May 24, 2005, pp. 1546-1549, XP007012344, 4 pages.
Zeng et al. "Liquid tunable microlenses based on MEMS techniques." Journal of physics D: Applied physics 46.32 (2013): p. 323001, XP020248055, DOI: 10.1088/0022-3727/46/32/323001, 20 pages.
Canadian Examiner's Report in Canadian Appl. No. 3,159,693 dated Sep. 27, 2023, 3 pages.
Chinese Office Action and Search Report with translation in Chinese App. 202080085551.6 dated Mar. 24, 2024, 22 pages.
Korean Office Action with translationin Korean App. No. 10-2022-7021514 dated May 22, 2025, 19 pages.
Xu, et al. "Fast-response liquid crystal microlens." Micromachines 5.2 (2014): 300-324.

\* cited by examiner

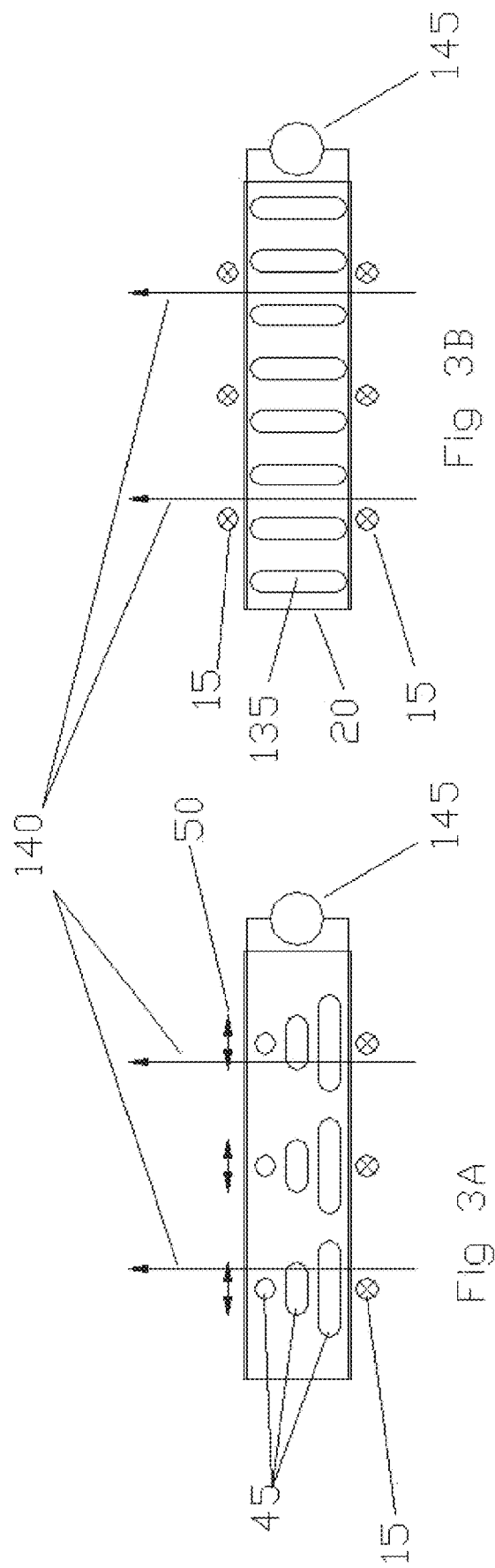

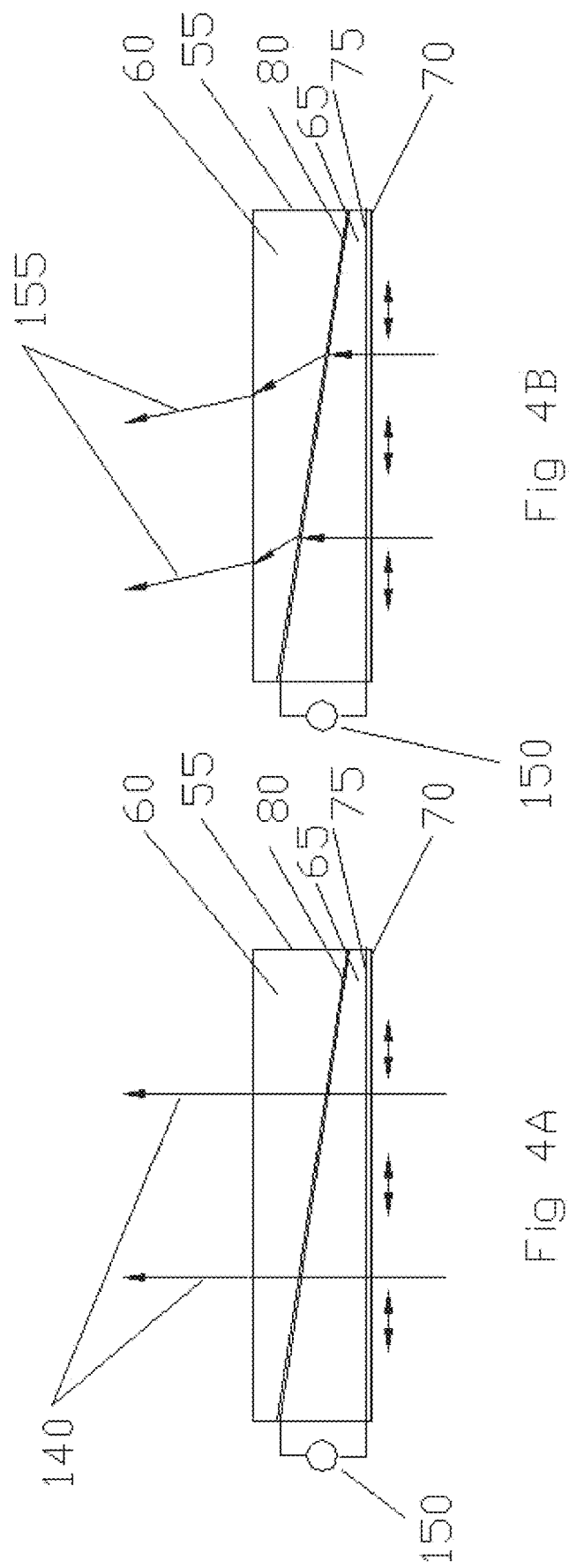

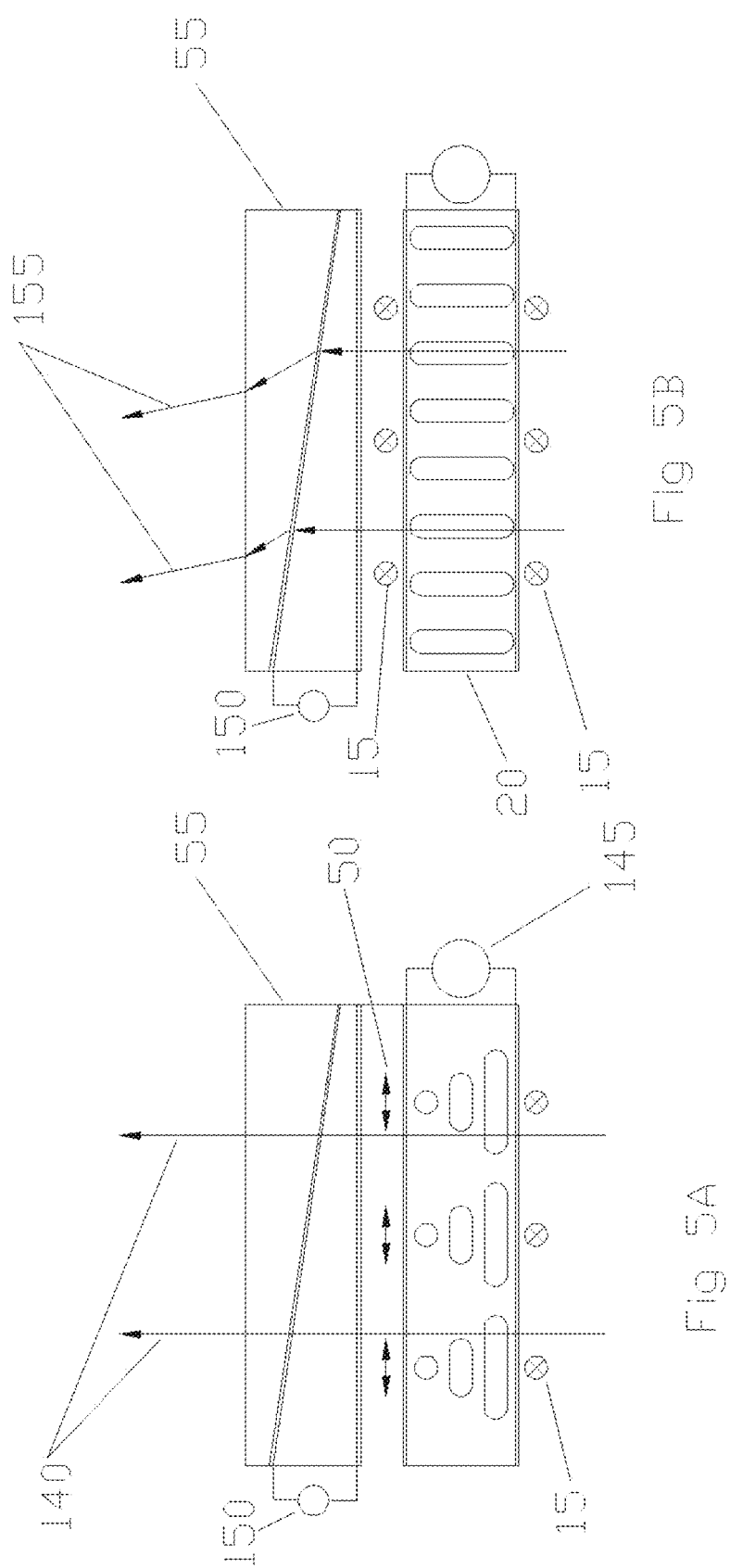

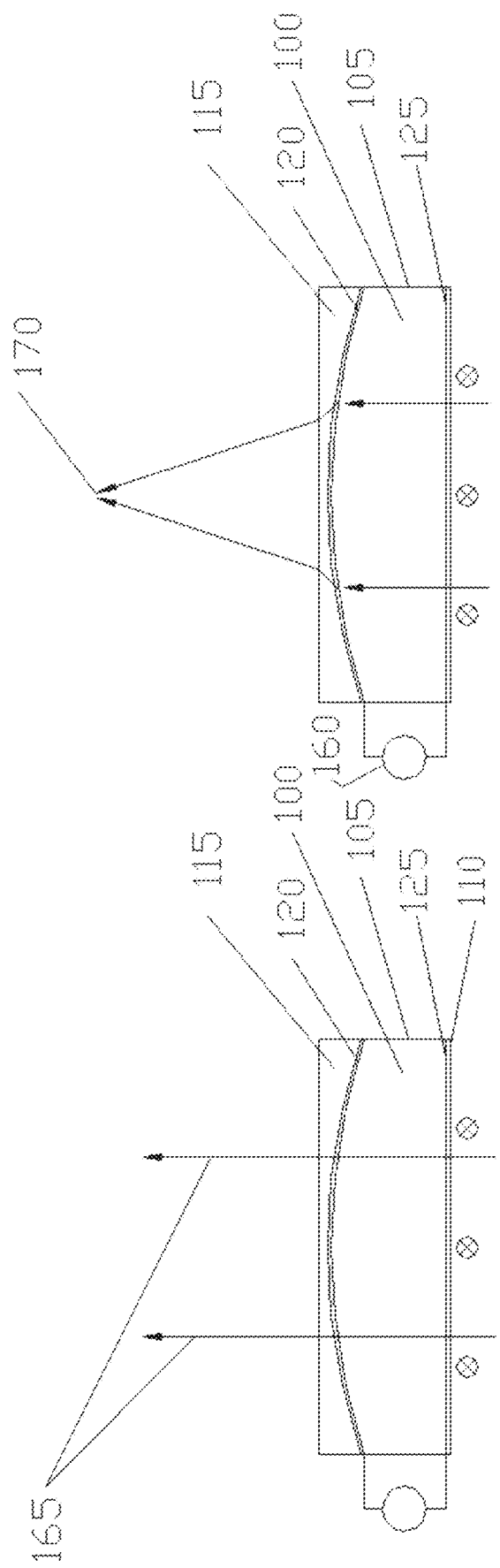

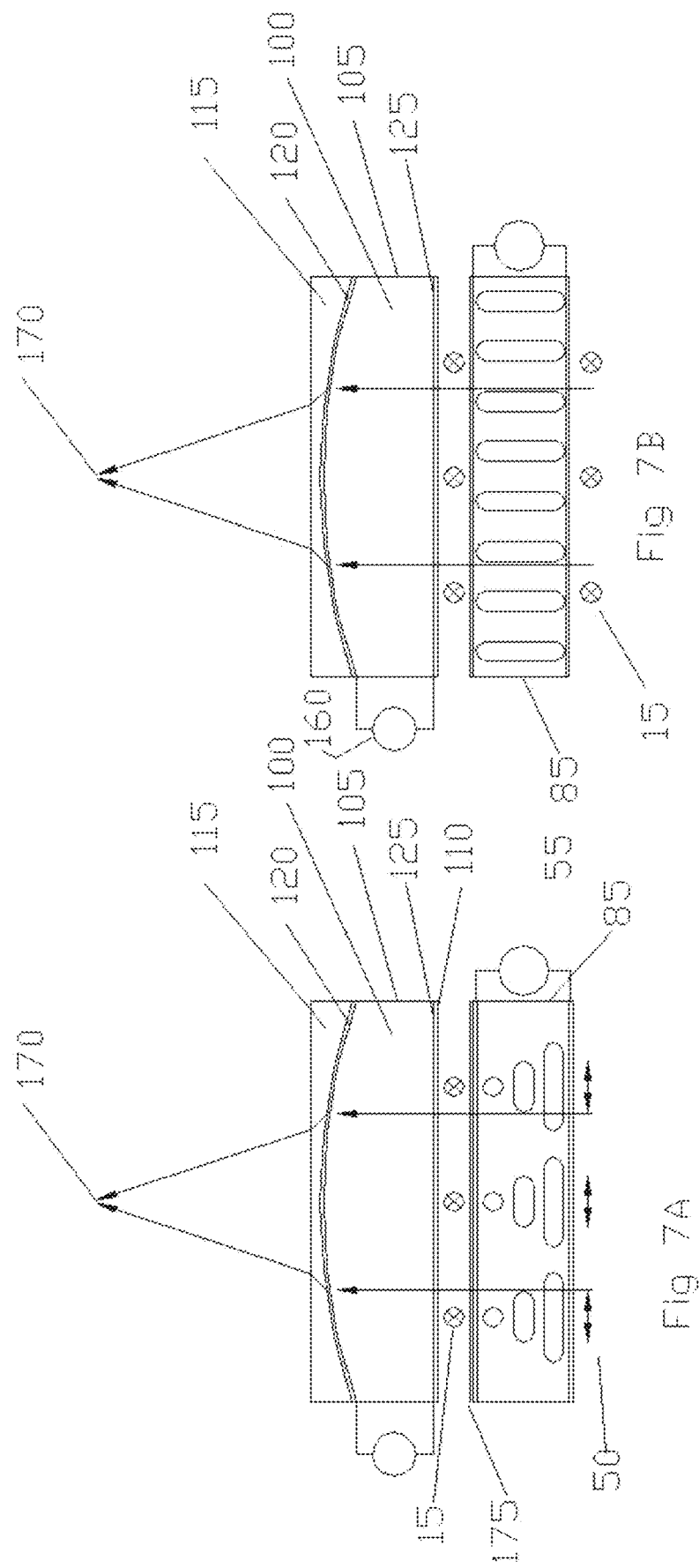

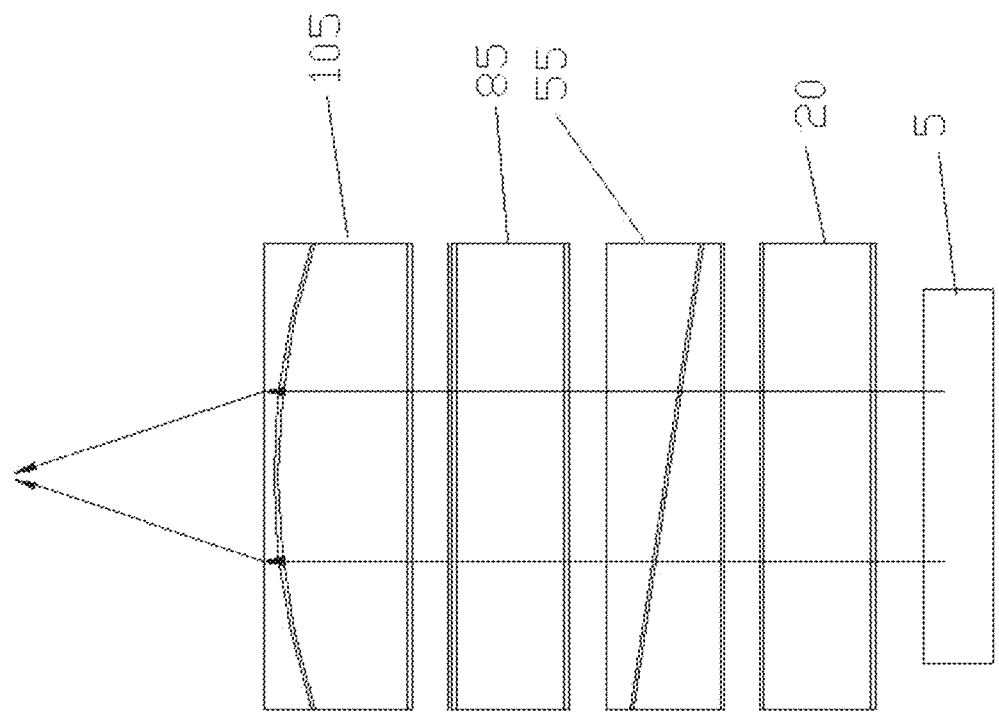
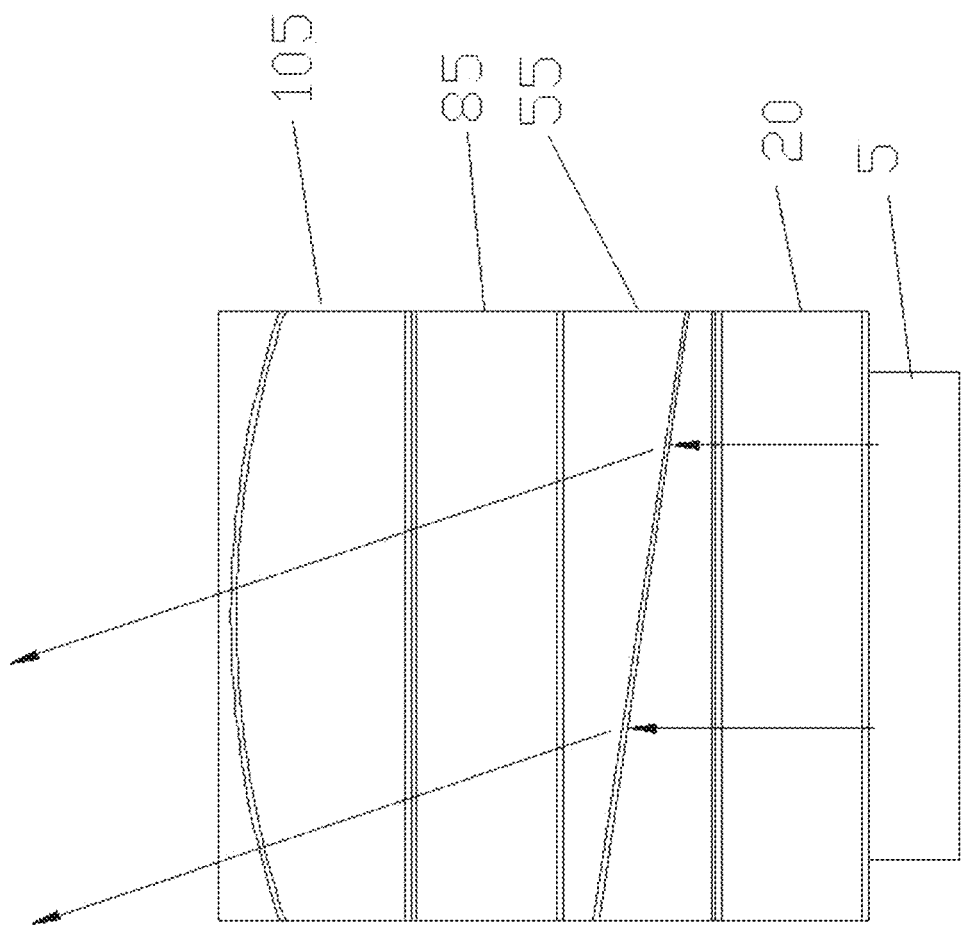

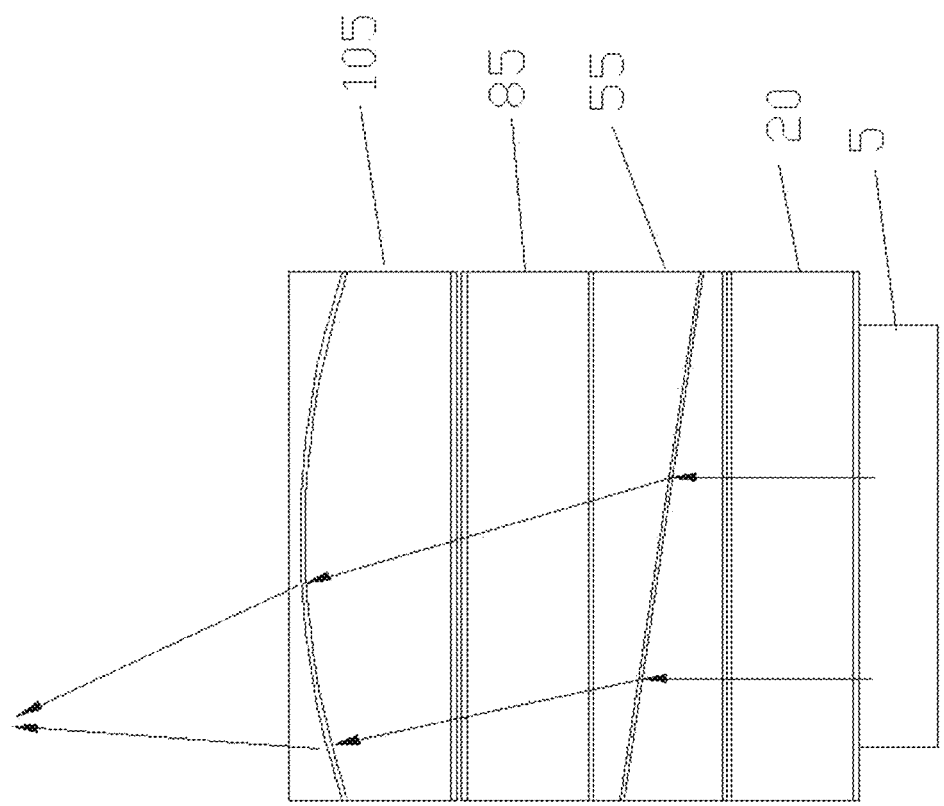

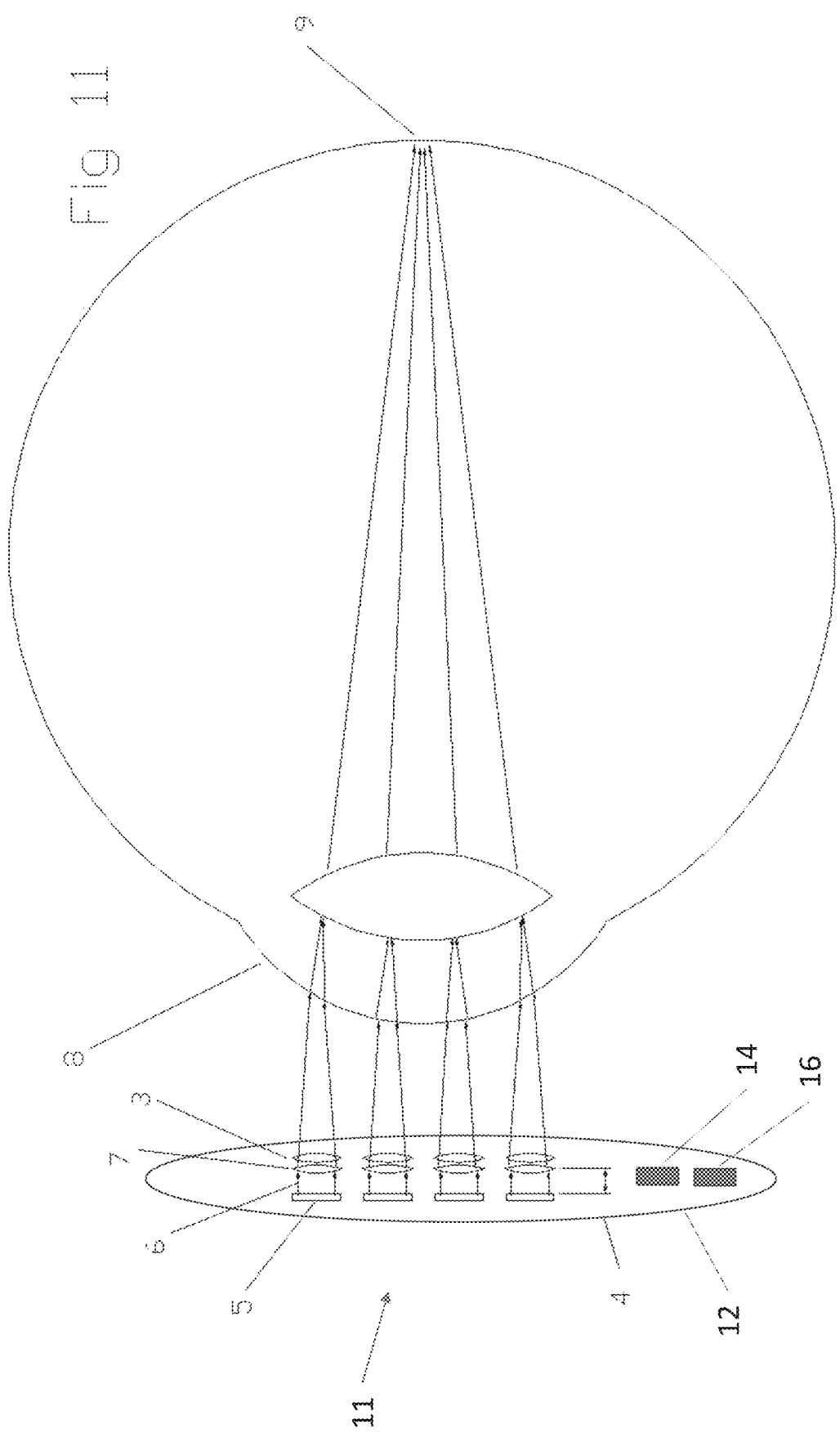

NEAR-EYE DISPLAY WITH ARRAY OPTICS

CROSS-REFERENCE TO RELATED APPLICATION(S)

This application is a bypass continuation of International Application No. PCT/US2020/064413, filed on Dec. 11, 2020, which in turn claims the priority benefit, under 35 U.S.C. § 119(e), of U.S. Application No. 62/950,707, filed on Dec. 19, 2019, and of U.S. Application No. 62/946,498, filed on Dec. 11, 2019. Each of these applications is incorporated herein by reference in its entirety.

BACKGROUND

A typical near-eye display includes an image generator for producing an image, an optical combiner for combining the image with ambient light, and imaging optics for bringing the image into focus for the person using the near-eye display. An image generator may have pixels that reflect light (e.g., liquid-crystal on silicon devices) or pixels that emit light (e.g., arrays of organic light-emitting diodes (OLEDs)). In either case, the image generator is typically not in the person's line of sight. Instead, it may be out of the person's field of view and project a beam that is at an angle to the person's line of sight.

The optical combiner brings light from the image generator into the person's line of sight. For instance, the optical combiner may be a cube beam splitter with one face or port perpendicular to the person's line of sight and facing the person's eye. Light from the image generator enters one of the beam splitter's other ports and is re-directed through the port facing the person's eye. If the near-eye display is an augmented reality display, the optical combiner combines light from image generator with light from the external world and projects the combined light to the person's eye.

The imaging optics bring the image generated by the image generator into focus. The imaging optics can be pupil forming or non-pupil forming. Pupil-forming optical systems produce an intermediate image at some point between the image generator and the eye. This image should be formed far enough away from the eye for the eye to bring it into focus. Non-pupil-forming optical systems do not create an intermediate image. Instead, they usually focus the image at infinity, so it appears in focus when the eye is relaxed (i.e., focused at far distance). Parameters for imaging optics in near-eye displays include: (1) eye clearance, which is the distance between the edge of the last optic and the exit pupil, typically 20 mm; (2) eye relief, which is the distance between the vertex of the last optic and the exit pupil; (3) eyebox (often equivalent to the exit pupil), which include the range of angular and lateral eye positions, at the eye relief distance, from which the entire image produced by the display is visible; (4) depth of field; and (5) field of view.

SUMMARY

More recently, see-through image generators have become available in the form of transparent OLED arrays. A near-eye display with a transparent OLED array or other see-through display does not need an optical combiner; instead, the see-through display can be placed directly in a person's line of sight and modulated to produce a changing virtual image. Optics between the see-through display and the person's eye help to bring the virtual image into focus.

The inventive technology utilizes a see-through display and couples it to dynamic, switchable optics to bring the virtual image into focus for the user. This technology can be implemented as a near-eye display that can be brought very near to the eye, e.g., like glasses, and used as an augmented reality device. Such a near-eye display includes optics that can focus light using electronically actuated components with no moving parts. This allows the near-eye display to be adjusted and focused to each individual's optical prescription. It also allows the optics used to bring the virtual image source in the near-eye display into focus and to be switched on and off as desired so the real world may be viewed without the virtual image present. The optics can also be rapidly switched off and on to combine the virtual image with the real-world image so that the viewer perceives the virtual and real-world images as if they were being viewed simultaneously. In addition, the optics can rapidly translate or relocate the focal points of the lenses that bring the virtual image into focus. This rapid translation can be used to increase the apparent number of visible pixels, improving/increasing resolution.

An inventive near-eye display may include an array of light-emitting transparent pixels in optical communication with an array of switchable micro-lenses. In operation, the array of light-emitting transparent pixels transmit ambient light and emit light toward an eye of a person wearing the near-eye display. The array of switchable micro-lenses focus the light so as to form a virtual image as perceived by a person wearing the near-eye display.

The array of light-emitting transparent pixels and the array of tunable micro-lenses can be embedded in a spectacle lens. There may be at least 100 pixels by 100 pixels in the array of light-emitting transparent pixels, if not more. There may be one switchable micro-lens per light-emitting transparent pixel in the array of light-emitting transparent pixels. And the array of switchable micro-lenses can switch between a focusing state and a non-focusing state at a rate of at least 60 Hz.

Each switchable micro-lens may be an electro-active lens that focuses the light to a focal point when the light is in a first polarization state and transmits the light without focusing the light to the focal point when the light is in a second polarization state. In this case, the near-display may include a polarization adjuster (e.g., a dynamic half-wave plate) in optical communication with the electro-active lens. The polarization adjuster can switch the light from the corresponding transparent light-emitting pixel, which emit light in the first polarization state, between the first polarization state and the second polarization state at a rate of at least 60 Hz.

The near-eye display can also include an array of tilt mechanisms in optical communication with the array of light-emitting transparent pixels and the array of switchable micro-lenses. These tilt mechanisms can steer the light emitted by the array of light-emitting transparent pixels between resolvable angles, e.g., at a rate of at least 60 Hz. In this case, there may be a first number of pixels in the array of light-emitting transparent pixels, and the tilt mechanisms can steer the light among the resolvable spots fast enough for the array of switchable lenses to form the virtual image with a second number of pixels greater than the first number of pixels.

Each tilt mechanism may include a polarization adjuster in optical communication with a polarization-selective beam director. The polarization adjuster switches the light from a corresponding transparent light-emitting pixels between a first polarization state and a second polarization state at a rate of at least 60 Hz. And the polarization-selective beam director directs the light in the first polarization state in a first direction and directs the light in the second polarization state in a second direction. This polarization-selective beam director may be a static polarization-selective beam director (e.g., a crystal-optic or polarizing thin-film beam splitter) or a dynamic polarization-selective beam director comprising birefringent liquid crystal material actuated by a voltage supply.

The near-eye display may also include an array of fixed micro-lenses, in optical communication with the array of tunable micro-lenses, to focus the light.

Another inventive near-eye display includes an array of light-emitting transparent pixels with a first number of pixels in optical communication with an array of polarization adjusters, an array of polarization-selective tilt mechanisms, and an array of switchable micro-lenses. In operation, the array of light-emitting transparent pixels transmits ambient light and emits light in a first polarization toward an eye of a person wearing the near-eye display. The array of polarization adjusters switch the light between the first polarization state and a second polarization state at a rate of at least 60 Hz. The array of polarization-selective tilt mechanisms direct the light in the first polarization state in first directions and direct the light in the second polarization state in second directions. And the array of switchable micro-lenses focus the light in the first polarization state and the light in the second polarization state so as to form a virtual image having a second number of pixels greater than the first number of pixels as perceived by the person wearing the near-eye display.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 3A and 3B illustrate operation of a (first) polarization adjuster (liquid crystal wave plate) of FIG. 2.

FIGS. 4A and 4B illustrate operation of the tilt mechanism of FIG. 2.

FIGS. 5A and 5B illustrate how the first polarization adjuster and the tilt mechanism can work together to steer light.

FIGS. 6A and 6B illustrate operation of the switchable lens of FIG. 2.

FIGS. 7A and 7B illustrate how a second polarization adjuster and switchable lens can work together to focus or collimate light.

FIG. 8 shows how the pixel and tunable micro-lens of FIG. 2 can steer collimated light.

FIG. 9 shows how the pixel and tunable micro-lens of FIG. 2 can focus light.

FIG. 10 shows how the pixel and tunable micro-lens of FIG. 2 can steer and focus light.

FIG. 11 shows an alternative near-eye display where each pixel includes or is coupled to a tunable lens like the one in FIGS. 6A and 6B that works in conjunction with a corresponding fixed lens.

DETAILED DESCRIPTION

Figure 1:
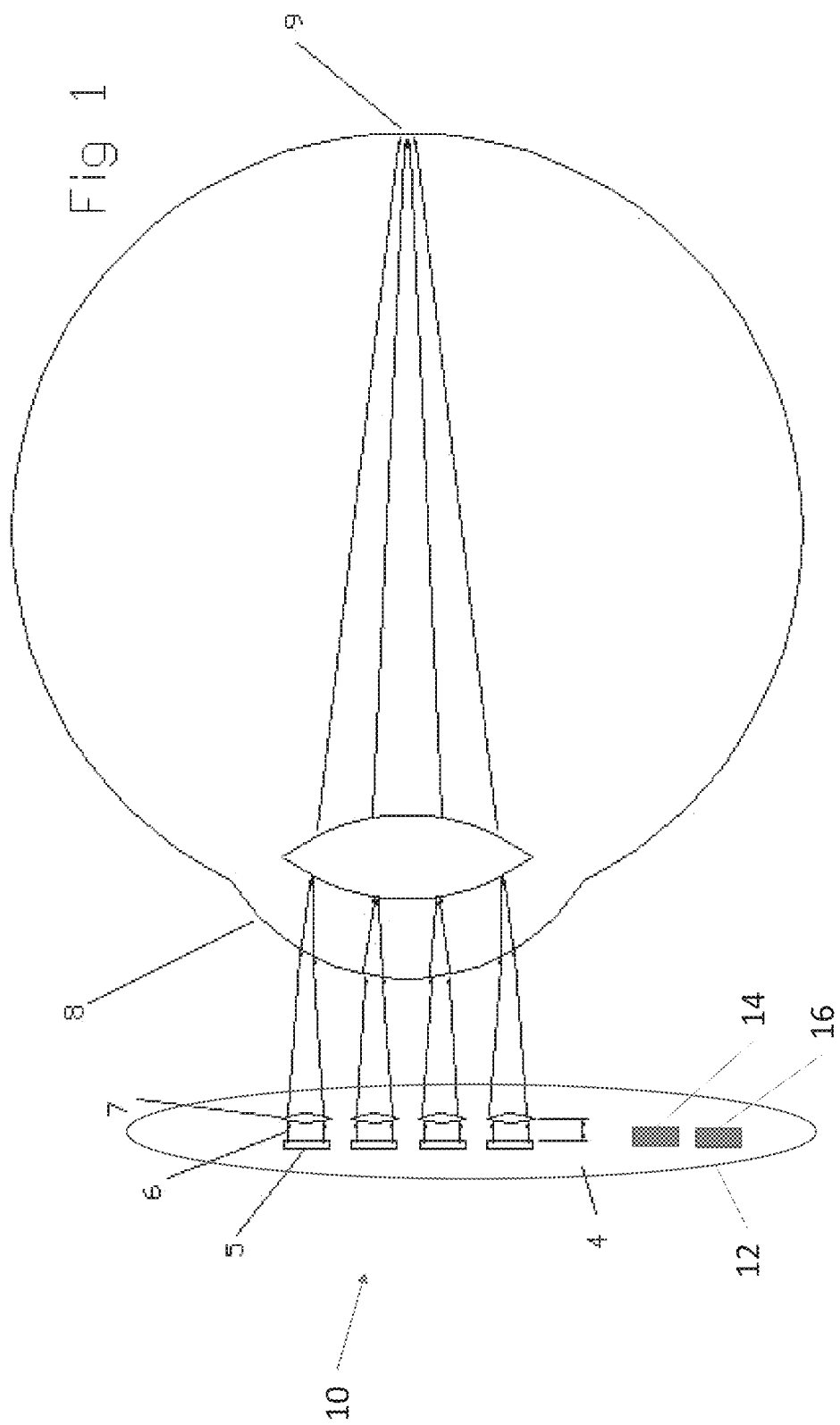
FIG. 1 shows a near-eye display.

FIG. 1 illustrates an example near-eye display 10 with transparent, light-emitting pixels 5 and tunable focusing and beam-steering elements 7, also called tunable micro-lenses. This near-eye display 10 may be mounted on or from an eyewear frame (not shown) or embedded in a spectacle lens 12 without or without optical power. Such a lens may also include an embedded controller 14 and power supply 16 for actuating and powering the pixels 5 and tunable micro-lenses 7. The controller 14 and/or power supply 16 can also be attached to or embedded in the frame and connected to the pixels 5 and tunable micro-lenses 7 via wired or wireless connections.

The pixels 5 can be implemented as a transparent array of OLEDs that emit red, green, and blue light. Although typical shapes of pixels made today are rectangular or circular, they can be any other suitable shape, with the shape limited mainly by the better manufacturing methods. An array of pixels, arranged in a two pixel by three pixel grid, can be used to show a useful character. Generally, near-eye displays with more pixels have finer spatial resolution, with a suitable near-eye display having an array of 1920 pixels by 1080 pixels. Other arrays may be many times this size. The pixel pitch can range from a few millimeters to a few hundred nanometers or even ten nanometers or less.

Each pixel 5 is separated from a corresponding tunable focusing and beam-steering element 7, also called a tunable micro-lens, by a distance 4. Depending on the number of pixels 5, the lateral dimensions of each pixel 5, and the pixel pitch, there may be one pixel 5 per tunable micro-lens 7 or more than one pixel 5 per tunable micro-lens 7. For example, if each pixel 5 emits light of only one color (e.g., red, green, or blue light), then there may be at least one pixel 5 that emits red light, one pixel 5 that emits green light, and one pixel 5 that emits green light per tunable micro-lens 7. In this case, the pixels 5 may be arranged in a Bayer pattern or other suitable pattern to provide full-color imagery. A larger pixel can be 1 mm by 1 mm. A smaller pixel could have a length or width of 6.3 microns or smaller. The micro-lenses' pitch and lateral dimensions can match those of the pixels, e.g., pitches and lateral dimensions on the order of 10 nm, 100 nm, 1 μm, 10 μm, 100 μm, 1 mm, or 10 mm.

In operation, each pixel 5 emits light 6 to the corresponding tunable micro-lens 7. The tunable micro-lens 7 steers and/or focuses the light 6 so that the eye 8 can bring the light to a focal point 9 on the retina. Adjusting the distance 4 between the pixels 5 and the micro-lenses 7 alters the degree of optical focusing by lens 7 to achieve the desired amount of pre-focus for the eye 8 to correctly focus the light at focal point 9. This adjustment of the distance 4 adapts the optics (micro-lenses 7) to the optical prescription of the eye 8.

Figure 2:
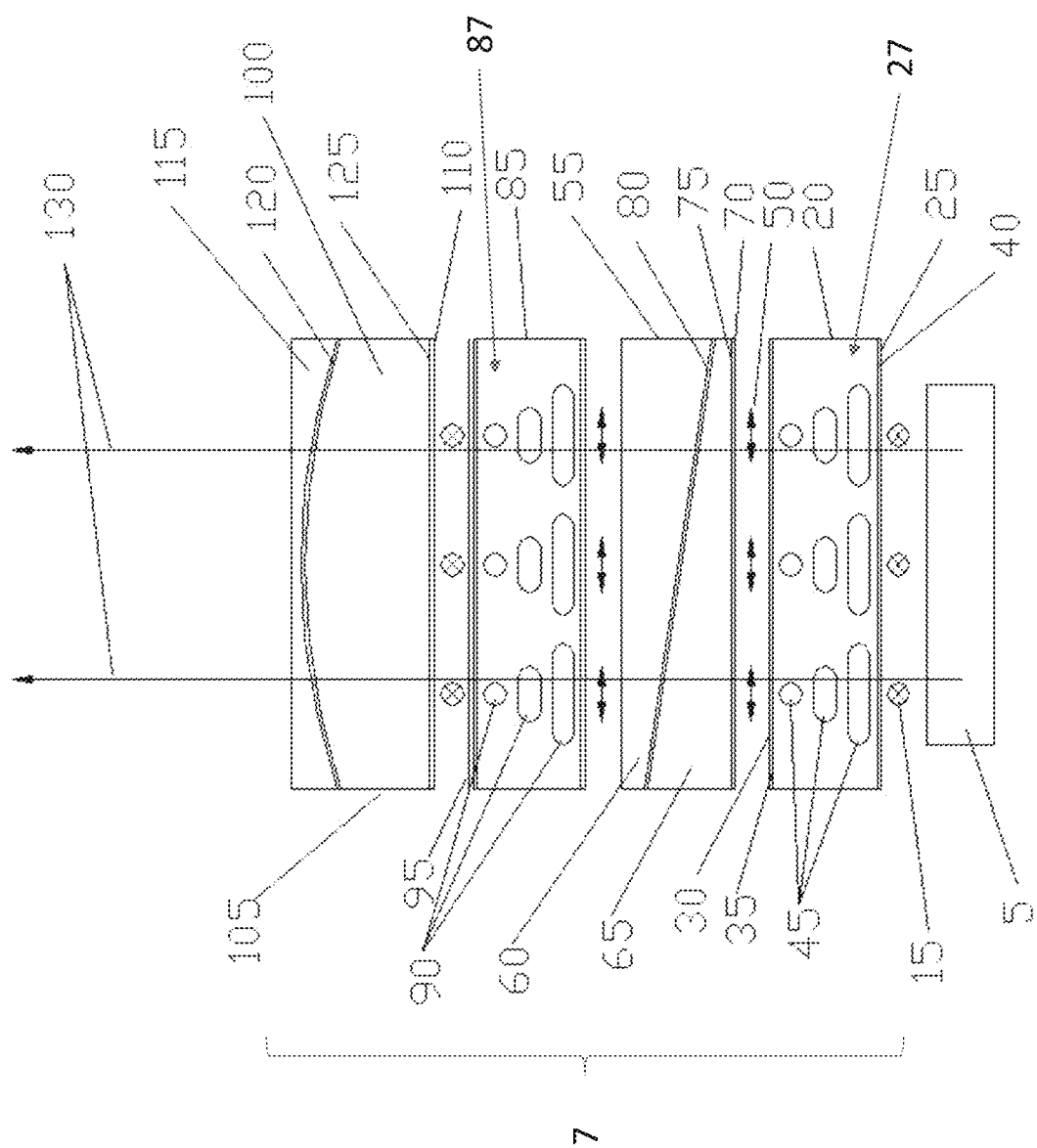
FIG. 2 shows a pixel and tunable micro-lens suitable for use in the near-eye display of FIG. 1.

FIG. 2 illustrates a single pixel 5 and a single tunable micro-lens 7 of the near-eye display 10 in greater detail. The tunable micro-lens 7 includes a first polarization adjuster (switchable half-wave plate) 20 in series with a tunable tilt mechanism/beam-steering element 55, a second polarization adjuster (switchable half-wave plate) 85, and a switchable lens 105. The first polarization adjuster 20 and second polarization adjuster 85 switch the polarization state of the light propagating through the tunable micro-lens 7 between a first linear polarization state 15 (e.g., perpendicular to the plane of the figure/drawing) and a second linear polarization state 50 (e.g., parallel to the plane of the figure/drawing). In other versions of the tunable micro-pixel, the polarization adjusters may switch the light between other polarization states, such as ±45° linear polarization states or left- and right-handed circular polarization states. The tunable tilt mechanism/beam-steering element 55 and switchable lens 105 steer and focus, respectively, light in one polarization state but not the other.

The tunable micro-lens 7 works by using the polarization adjusters to switch the polarization state of light 130 emitted by the pixel 5 so that the light 130 is steered or focused by the tilt mechanism/beam-steering element 55 and switchable lens 105, respectively, or passes through these elements unaltered. In operation, pixel 5 emits light beam 130 in polarization state 15, which is perpendicular to the flat plane of the figure/drawing (this polarization state is indicated by the X, which is the tail of an arrow, representing the polarization vector, pointing into the plane of the figure/drawing). Light 130 enters polarization adjuster 20 in polarization state 15, then emerges in polarization state 50. Polarization state 50 is the symbol used to identify that the linear polarization direction is parallel to the flat plane of the of the figure/drawing, or in other words, across the figure/drawing oriented left to right or right to left.

Each pixel 5 can be implemented as an OLED that emits monochromatic (e.g., red, green, or blue) light in the first polarization state 15. A pixel 5 may also be configured to emit randomly polarized light. If this is the case, the light may be either polarized in the first polarization state 15 with a polarization filter or allowed to pass through the system randomly polarized whereby the various components affect only the light that is in the desired polarization state to achieve the intended result and do not affect the components of light in other polarization states.

Polarization Switching and Beam-Steering Elements of the Tunable Micro-Lens

The first polarization adjuster 20 is a half-wave plate that can be switched between no retardance in a first state and a half-wave retardance in a second state. An example switching speed of this component is 30 milliseconds, but it can range between 5 and 300 milliseconds depending upon the liquid crystal used. The first polarization adjuster 20 is comprised of a first substrate 25 and a second substrate 30, with a layer of liquid crystal 27 (for example, Merck MLC-2140) sandwiched and sealed between the two substrates 25 and 30. On the surface of the first substrate 25 is a first electrode 40, which is comprised of a transparent, electrically conductive coating (for example, indium tin oxide (ITO)), and atop the ITO is a first transparent alignment layer (not shown; for example, polyimide made from Nissan Sunever 410 polyimide varnish). The first alignment layer is typically applied, cured, and then rubbed with a felt cloth along in the direction of the desired alignment orientation of the liquid crystal. Adjacent to the first electrode 40 is the liquid crystal 27.

On the surface of the second substrate 30 is a second electrode 35, which is made of transparent conductive material (e.g., ITO). There is a second alignment layer on the second electrode 35. The first and second alignment layers are rubbed or oriented to align the liquid crystal molecules in orthogonal directions. In the example shown in FIG. 2, the first alignment layer is configured to orient adjacent liquid crystal molecules 27 parallel to the second polarization state 50 (parallel to the plane of the page), whereas the second alignment layer is configured to orient adjacent liquid crystal molecules parallel to the first polarization state 15 (perpendicular to the plane of the page). These alignment layers appear crossed when viewed along the tunable micro-lens's optical axis, which is perpendicular to the first and second polarization states.

This crossed alignment layer configuration causes the liquid crystal molecules to assume a twisted configuration 45 in the absence of an applied voltage. That is, when relaxed, the liquid crystal molecules are aligned in orientation/direction 50 close to the first substrate 25, aligned in orientation/direction 15 close to the second substrate 30, aligned in the middle of the liquid crystal layer in an orientation/direction midway between orientation 50 and orientation 15, and gradually twisted more in the direction closer to orientations 50 and 15 the closer the liquid crystal is to the first and second electrodes 40 and 35, respectively. When the liquid crystal 27 is in the twisted configuration 45, the first polarization adjuster 20 changes the polarization state of the incident light 130 from the first polarization state 15 to the second polarization state 50. Applying a voltage across the first and second electrodes 40 and 35 causes the liquid crystal 27 to untwist (straighten out). Light 130 propagating through the first polarization adjuster 20 when the liquid crystal 27 is untwisted remains in the first polarization state 15.

FIGS. 3A and 3B show the first polarization adjuster 20 in its off and on states, respectively. FIG. 3A shows a voltage source 145 connected to the electrodes 35 and 40. When this voltage source 145 is off, the liquid crystal 27 is in the twisted orientation 45. This is referred to as the off state. In FIG. 3B, the voltage source 145 is on, resulting in the reorientation of the liquid crystal 27 into a straightened or untwisted orientation 135, in which the liquid crystal molecules are aligned perpendicular to the substrates 35 and 40 of the first polarization adjuster 20. This is referred to as the on state.

Referring again to FIG. 2, the tilt mechanism 55 is comprised of two wedge-shaped structures 60 and 65. The first structure 60 can be made from a solid material, such as glass, while the second structure 65 may be constructed from either a solid birefringent material, such as quartz, or a cavity containing an adjustable birefringent material, such as liquid crystal. (In these cases, the tilt mechanism 55 can be implemented as a Glan-Thompson polarizer, Rochon prism, Wollaston prism, calcite beam displacer, or other suitable crystal polarizer.) If the second structure 65 is constructed from a solid birefringent material, the solid birefringent material is oriented such that its index of refraction matches that of the first structure 60 along the second polarization direction 50, while its index of refraction is different than that of the first structure 60 along the first polarization direction 15. Operation of a static tilt mechanism 55 is controlled by the first polarization adjuster 20. When polarization is rotated one way, no tilt is introduced. When polarization is rotated the other way, tilt occurs. Therefore, the speed of this component is the same as the speed of the polarization adjuster. This is the preferred embodiment.

In an alternative embodiment, the second structure 65 can instead be constructed as a sealed cavity that contains an electrically actuated, birefringent liquid, such as liquid crystal material. In this case, a third substrate 70 may be added to provide one boundary of the cavity. One side of the first structure 60 provides another boundary of the cavity. Side sealing structures (not shown) seal the liquid crystal in the cavity.

In this configuration, there are transparent electrodes 75 and 80 on opposite sides of the cavity (e.g., on the surfaces of the first structure 60 and third structure 70 bounding the cavity). These electrodes 75 and 80 perform the same functions as the electrodes 35 and 40 in the first polarization adjuster 20. With no voltage applied to the electrodes 75 and 80, the liquid crystal is oriented to be index-matched to the first structure 60. In this state, light 130 passes through tilt mechanism 55 unaffected in its direction of propagation or its polarization state. Applying a voltage to the electrodes 75 and 80 re-orients the liquid crystal so that its refractive index no longer matches the refractive index of the first structure 60. As a result, light 130 passing through the tilt mechanism 55 refracts at the boundary between the first structure 60 and the second structure 65. This refraction steers the light 130 without changing the light's polarization state.

FIGS. 4A and 4B show the liquid-crystal tilt mechanism 55 with a voltage source 150 connected to the electrodes 75 and 80. FIG. 4A shows the tilt mechanism when the voltage source 150 is off, and FIG. 4B shows the tilt mechanism when the voltage source 150 is on. When the voltage source 150 is off, light 140 in the second polarization state 50 experiences the same index of refraction in both the liquid crystal 65 and first structure 60, so no optical effect (tilting or steering) occurs. When the voltage source 150 is on, the liquid crystal 65 re-orients itself to create a refractive index mismatch at the boundary between the liquid crystal 65 and first structure 60 for light 155 in the second polarization state 50. This results in a tilting of light beam 155 at the boundary as shown in FIG. 4B. The tilt angle is large enough to produce a spot that can be resolved from the spot produced when the tilt mechanism is off (i.e., the tilt angle is resolvable, as are the corresponding spots formed by the tilted and untilted beams in the plane of the virtual image). The light beam 155 refracts again as it exits the first structure 60 into free space.

FIG. 4B show the tilt mechanism 55 operating alone, without other components attached. In a preferred embodiment, however, the tilt mechanism 55 is bonded directly to another component with the same index of refraction. Because the refractive index does not change across this interface, the exiting beam of light should not refract as it leaves the tilt mechanism 55.

The tilting of light occurs for only in one polarization direction of the light (here, the second polarization state 50). Incident light in the orthogonal polarization state (the first polarization state 15) propagates through the tilt mechanism 55 without bending or tilting whether or not the voltage supply 140 is on.

If the liquid crystal in the cavity version of the tilt mechanism 55 is a planar liquid crystal (rather than a vertically aligned liquid crystal), the amount of change of the liquid crystal's index of refraction may be controlled by the voltage applied in an analog fashion, making the tilt mechanism 55 an analog adjustable device. An example liquid crystal is Merck MLC-2140, which responds to voltage changes typically from 0.5 volts to 8 volts peak-to-peak. The voltage is typically an alternating current (AC) sine wave or square wave at frequencies typically between 15 and 60 Hz. Lower frequencies can be used, but flicker may become visible. Higher frequencies may be used but power consumption then increases.

FIGS. 5A and 5B show how the tilt mechanism 55 and first polarization adjuster 20 work together to select tilt or steer light. When the first polarization adjuster 20 is in the off state shown in FIG. 5A, no tilting occurs, regardless of the on or off state of the liquid crystal in the tilt mechanism 55. When the first polarization adjuster 20 and the tilt mechanism 55 are both on as shown in FIG. 5B, tilting occurs. The first polarization adjuster 20 switches state much faster than tilt mechanism 55 because the liquid crystal layer 27 in the polarization switcher 20 is much thinner than the liquid crystal layer in the tilt mechanism 55. This allows the tilt mechanism's function of tilting to be switched on and off faster than by switching the tilt mechanism 55 itself.

If the tilt mechanism 55 has a solid birefringent material instead of a birefringent liquid crystal, the amount of tilt provided by the tilt mechanism may not be tunable, but the tilt mechanism may still be switched on and off quickly by utilizing the first polarization adjuster 20. This is a preferred embodiment.

Two or more tilt mechanisms 55 (and polarization adjusters 20 if desired) may be coupled or stacked in series with the tilt orientation at different angles to each other, allowing tilting to be conducted in more than one direction. For example, one tilt mechanism oriented as in FIGS. 5A and 5B stacked on another tilt mechanism rotated by 90° about the optical (z) axis could produce four different beam-steering or tile angles: two left to right and two "in and out" relative to the flat plane of the FIGS. 5A and 5B.

Polarization Switching and Focusing Elements of the Tunable Micro-Lens

Referring again to FIG. 2, the light emerging from the tilt mechanism 55 enters the second polarization adjuster 85. Like the first polarization adjuster, the second polarization adjuster 85 may be a half-wave plate that can be switched between no retardance in a first state and a half-wave retardance in a second state. The liquid crystal is in a twisted configuration 90 (the same as configuration 45) when no power is applied to the second polarization adjuster 85 and in an untwisted configuration when power is applied. In the twisted (off) configuration 90, the second polarization adjuster 85 converts light in the first polarization state 15 to the second polarization state 50. And in the untwisted (on), light in the first polarization state 15 propagates through the second polarization adjuster 85 without changing state.

As shown in FIG. 2, the light emerging from the second polarization adjuster 85 enters the switchable lens 105, which is comprised of a solid component 115 with a concave surface and a plano substrate 110 that are joined together to create a sealed cavity 100. There is a first electrode 120 on the concave surface and a second electrode 125 on the surface of the plano substrate 110 facing the concave surface. These electrodes 120 and 125 are transparent and are coated with alignment layers with parallel or anti-parallel rub/alignment directions. (The alignment layers in the polarization adjusters are rubbed in directions orthogonal to each other, whereas the alignment layers in the other components typically are rubbed parallel or anti-parallel to each other.) Within the cavity is a volume of liquid crystal whose birefringent orientations are oriented to be index-matched to the structure 115 when no voltage is applied across the electrodes 120 and 125. In this off state, light passes through lens 105 unaffected in its direction of propagation regardless of polarization. Applying a voltage across the electrodes 120 and 125 causes the liquid crystal molecules to re-orient themselves. This re-orientation increases the apparent refractive index of the liquid crystal material, causing light passing through the switchable lens 105 to come to a focus.

The switchable lens can have an on-state focal length of as little as 1 mm to as much as 25 mm. It can switch as fast as 3 milliseconds or as slow as 300 milliseconds, depending upon the liquid crystal used and the lens size. The lenses' optical power may be either on/off only, or analog tunable over a range. A small lens (e.g., 1 mm in diameter) usually switches faster than a larger lens (e.g., 3 mm diameter), and a lower rotational viscosity liquid crystal usually switches faster than a higher rotational viscosity liquid crystal.

The cavity 100 could also be constructed from a solid and/or non-adjustable birefringent material oriented similarly. In this case, the switchable lens 105 could be operable as a binary on/off component. Similarly, the plano substrate 110 could be replaced by a substrate with another concave surface or a convex surface to form a cavity in the shape of a bi-convex lens or a convex-concave lens. The substrate surface could also be patterned in the shape of a Fresnel, diffractive, or stepped surface.

FIGS. 6A and 6B show the switchable lens 105 with a voltage supply 160 connected to the electrodes 120 and 125. Cavity 100 is filled with liquid crystal. When the voltage supply 160 is off, light 165 passes through the cavity 100 (and the switchable lens 105) with no optical effects occurring. This is because the index of refraction of the liquid crystal along the switchable lens's optical axis is the same as the index of refraction of element 115 for light polarized in the first polarization state 15. This is the state shown in FIG. 6A. When the voltage supply 160 is on and applies a voltage across the electrodes 120 and 125, the liquid crystal in cavity 100 aligns with the applied electric field. This changes the liquid crystal's index of refraction along the switchable lens's optical axis, causing light polarized in the first polarization state 15 to come to a focus, for example, at a focal point 170. Due to the birefringence of the liquid crystal, the switchable lens 105 does not focus light in the second polarization state 50, even if the voltage source 160 is on.

If planar liquid crystal is used, for example, Merck-MLC-2140, the index of refraction can be tuned in an analog fashion, making the location of focal point 170 analog adjustable. This makes it possible to adjust the focal length of the tunable micro-lens 7 without changing the distance 4 between the tunable micro-lens 7 and the pixel 5 as shown in FIG. 1.

In order for the switchable lens 105 to focus incident light, the polarization of the light should be aligned with the rub direction of the switchable lens's alignment layers, which in this example is parallel or anti-parallel with the first polarization state 15. In some cases, depending upon the states of the components earlier in the optical path, the light that reaches the point of entry of lens 105 may be in the second polarization state 50. In these cases, if the beam is supposed to be focused, the second polarization adjuster 85 switches the incident light from the second polarization state 50 to the first polarization state 15 so the switchable lens 105 can focus the beam. Likewise, if the light impinging upon the second polarization adjuster 85 is in the first polarization state 15 and the second polarization adjuster 85 is in the off state, the light emerges from the second polarization adjuster 85 in the undesired orientation (i.e., the second polarization state 50 as in FIG. 3A). In these cases, the second polarization adjuster 85 should be on to ensure that light reaching the switchable lens 105 is in the first polarization state 15.

FIGS. 7A and 7B show operation of the switchable lens 105 in series with the second polarization adjuster 85 (which is connected and controlled and operates in the same manner as the first polarization adjuster 20). In FIG. 7A, the incident light is in the second polarization state 50, the second polarization adjuster 85 is off, and the switchable lens 105 is on. The second polarization adjuster 85 transforms the incident light from the second polarization state 50 to the first polarization state 15, and the switchable lens 105 focus the light to the focal point 170. In FIG. 7B, the incident light is in the first polarization state 15, the second polarization adjuster 85 is on, and the switchable lens 105 is on. The incident light propagates through the second polarization adjuster 85 without changing polarization state and is focused by the switchable lens 105 to the focal point 170.

The second polarization adjuster 85 switches state (i.e., on and off) much faster than the switchable lens 105, allowing it to be used as a faster on/off switch for the optical power of the switchable lens 105. The switchable lens 105 may be adjusted to the desired optical power, then switched on and off by the faster second polarization adjuster 85, even though the switchable lens 105 remains in the on state. Alternatively, the liquid crystal within the lens cavity 100 could be a cholesteric liquid crystal, eliminating the polarization aspect of the system and the second polarization adjuster 85, and making the lens a binary switchable on/off optic.

FIG. 7A also shows a light filter 175 on the surface of the second polarization adjuster 85 closest to the switchable lens 105. Light-activated curing polymers and/or monomers can be added to the liquid crystal in cavity 100, allowing the switchable lens's optical power to be frozen or fixed after its optical power is adjusted to the user's prescription. If the liquid crystal in the polarization adjuster should not be frozen or fixed during the lens curing process, the passband of the filter 175 can be selected to block the light-activating/curing wavelengths being used to cure the polymers in the lens cavity 100 from reaching the second polarization adjuster 85. This approach may be utilized to fit the near-eye display to a particular person's eye prescription then freeze it in place to simplify the system. If no light sensitive polymers are used in the polarization adjuster, and the liquid crystal used is UV stable, then the filter 175 is not required.

Steering and/or Focusing Light with a Near-Eye Display

FIGS. 8-10 illustrate operation of the pixel 5 and complete tunable micro-lens 7 in the near-eye display 10 with a static tilt mechanism 55. FIG. 8 shows the system with the first polarization adjuster 20 set to cause the tilt mechanism 55 to tilt light and the lens 105 in the off state. The system tilts light but does not focus it. FIG. 9 shows the system with the first polarization adjuster 20 set to cause the tilt mechanism 55 to transmit light without tilting and the lens 105 in the on state. FIG. 10 shows the first polarization adjuster 20 set to cause the tilt mechanism 55 to tilt light from the pixel 5 and the lens 105 in the on state. Light is tilted and focused.

Table 1 is a truth table showing whether the tunable micro-lens 7 bends or focuses light from the pixel 5 for the different combinations of settings for the first polarization adjuster 20, second polarization adjuster 85, and switchable lens 105 with a static tilt mechanism 55.

TABLE 1

Truth Table for Tunable Micro-Lens Component Settings

| First Polarization Adjuster 20 | Second Polarization Adjuster 85 | Switchable Lens 105 | Bend? | Focus? |
| --- | --- | --- | --- | --- |
| Off | Off | Off | No | No |
| On | Off | Off | Yes | No |

TABLE 1-continued

Truth Table for Tunable Micro-Lens Component Settings

| First Polarization Adjuster 20 | Second Polarization Adjuster 85 | Switchable Lens 105 | Bend? | Focus? |
|---|---|---|---|---|
| On | On | Off | Yes | No |
| On | On | On | Yes | No |
| On | Off | On | Yes | No |
| Off | Off | On | No | Yes |

In some of the example component states described above, light passes through the tunable micro-lens 7 with no focusing or tilting occurring. This can be described as the tunable micro-lens's "all-off state." This state could be used in the condition desired to allow the user to see the real-world objects beyond the pixel 5/near-eye display 10.

Although the components are shown as being separated to improve clarity of FIG. 9, they may be bonded together with no air interface (and therefore little to no refraction) between them as shown in FIGS. 8 and 10. In other words, the components can be integrated together in an optic block without moving parts. This optic block is more rugged and less susceptible to vibration than discrete components. If the components are made of materials with low coefficients of thermal expansion, the optic block may also be less susceptible to temperature fluctuations.

Near-Eye Displays with Tunable and Fixed Micro-Lenses

FIG. 11 shows an alternative near-eye display 11 with tunable micro-lenses 7 that work in conjunction with respective fixed lenses 3. The fixed lenses 3 can be conventional lenses fabricated from glass or plastic and formed together in a micro-lens array. The fixed lenses 7 allows the tunable ranges of the tunable micro-lenses 7 to be reduced to allow for thinner, faster-switching layers of liquid crystal to be used in the polarization adjusters, tilt mechanisms, and switchable lenses of the tunable micro-lenses 7. For example, if the total range of desired adjustment is from 300 to 500 diopters of optical power, the fixed lens 3 could be made with 300 diopters of optical power and the tunable micro-lens 7 could be have an adjustment range of 0 to 200 diopters rather than from 0 to 500 diopters.

In both the near-eye display 10 of FIG. 1 and the near-display 11 of FIG. 11, the pixel 5 and tunable micro-lens 7 are shown as fully featured, meaning that they can accomplish pixel light emission, polarization adjusting, tilting and focus changing, etc. In operation, not all features may be desired at once. In those cases, only the portions needed to accomplish the desired goal may be included in the deployed system while other portions may be omitted.

The plano and concave surfaces and orientation of liquid crystal molecules and birefringence described above and illustrated in the figures are only examples; other substrate/lens shapes and liquid crystal orientations can be used instead to accomplish the desired bending and focusing of light. This focusing could be in different directions, for example, diverging rather than converging. Similarly, the tilt mechanism 55 could be arranged to tilt light to the left rather than to the right and the polarization adjusters 20 and 85 could be changed or arranged to switch the polarization of incident light from the second polarization state 50 to the first polarization state 15 rather than vice versa, etc.

Although the tunable lenses described above use liquid crystal as the material for modifying the index of refraction of certain layers, other materials with changeable index of refractions may be used, including lithium niobate ($LiNbO_3$), barium titanate ($BaTiO_3$), lithium tantalite ($LiTaO_3$), and many others.

Beam Steering to Increase Apparent Near-Eye Display Resolution

The fast tilting or beam steering provided by the tunable micro-lenses 7 can be used to increase the apparent spatial resolution of the near-eye displays 10 and 11. By switching each micro-lens's focal point between a pair of resolvable spots faster than the flicker fusion threshold frequency, the user can be made perceive a resolution that is higher than the display's resolution. The flicker fusion threshold frequency is the frequency at which an intermittent light stimulus appears to be completely steady to the average human observer. The flicker fusion threshold frequency depends upon several factors, but generally is between 15 Hz and 60 Hz.

Thanks to the fast switching rates of the first and second polarization adjusters 20 and 85, the tunable micro-lens 7 can steer and focus light from pixel 5 back and forth between two points at a rate above the flicker fusion threshold. This causes the person wearing the near-eye display 10, 11 to perceive two distinct pixels, even though there is actually only one. If the tunable micro-lens 7 switches light from the pixel 5 between these two locations at a duty cycle of 50%, then each of the two apparent pixels should appear half as bright as the actual pixel 5.

This beam-steering and focusing can be used to double or quadruple the number of apparent pixels in the near-eye display 10, 11. For example, if the near-eye display 10, 11 has an array of 100 pixels×100 pixels, each with a corresponding tunable micro-lens 7 as shown in FIG. 2, the near-eye display's apparent resolution can be increased to 200 pixels×100 pixels. If a second tilting mechanism 55 is added each tunable micro-lens 7 to tilt the beams in an orthogonal direction (e.g., up and down in addition to the left and right switching provided by the first tilt mechanism 55), then light from each pixel 5 can be shifted in two directions. This makes it possible to project four apparent pixels from a single pixel. Thus, a 100 pixel×100 pixel near-eye display 10, 11 could be perceived to be a 200 pixel×200 pixel display.

The tunable micro-lens 7 can also be switched between focused and unfocused states faster than the flicker fusion threshold frequency with the second polarization adjuster 85. "Turning off" the switchable lens 105 with the second polarization adjuster 85 faster than the flicker fusion threshold frequency causes the corresponding pixel 5 and ambient light to appear superimposed on each other to the person wearing the near-eye display 10, 11. Put differently, it causes the virtual image from the pixels 5 and the real image to appear simultaneously. This person sees two views in quick alternating succession, one view being the virtual image and the other being the real world image, providing the person with the illusion of the virtual image superimposed over the real world image. Adjusting the brightness of the pixel 5 or the duty cycle of the second polarization adjuster 85 changes the apparent brightness of the virtual image. (Alternatively, the pixels 5 can simply be turned on and off faster than the flicker fusion threshold frequency to achieve the same effect.)

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A near-eye display comprising:
   an array of light-emitting transparent pixels to transmit ambient light and to emit light toward an eye of a person wearing the near-eye display; and
   an array of switchable micro-lenses, in optical communication with the array of light-emitting transparent pixels, to focus the light so as to form a virtual image as perceived by a person wearing the near-eye display, the array of switchable micro-lenses comprising:
      a liquid-crystal lens, in optical communication with a corresponding transparent light-emitting pixel in the array of light-emitting transparent pixels, switchable between (i) a focusing state in which the liquid-crystal lens focuses the light to a focal point when the light is in a first polarization state and transmits light in a second polarization state and (ii) a non-focusing state in which the liquid-crystal lens transmits the light in the first polarization state without focusing the light in the first polarization state; and a polarization adjuster, between the corresponding transparent light-emitting pixel and the liquid-crystal lens, switchable, faster than the liquid-crystal lens switches between the focusing state and the non-focusing state, between a first state in which the polarization adjuster switches the light from the first polarization state to the second polarization state and a second state in which the light in the first polarization state propagates through the polarization adjuster without changing polarization state.

2. The near-eye display of claim 1, wherein the array of light-emitting transparent pixels and the array of switchable micro-lenses are embedded in a spectacle lens.

3. The near-eye display of claim 1, wherein the array of light-emitting transparent pixels is at least 100 pixels by 100 pixels.

4. The near-eye display of claim 1, wherein the array of switchable micro-lenses comprises one switchable micro-lens per light-emitting transparent pixel in the array of light-emitting transparent pixels.

5. The near-eye display of claim 1, wherein the array of switchable micro-lenses is configured to switch between the focusing state and the non-focusing state at a rate of at least 60 Hz.

6. The near-eye display of claim 1, a wherein the polarization adjuster is configured to switch the light from the corresponding transparent light-emitting pixel between the first polarization state and the second polarization state at a rate of at least 60 Hz.

7. The near-eye display of claim 1, wherein the array of light-emitting transparent pixels is configured to emit the light in the first polarization state.

8. The near-eye display of claim 1, further comprising:
an array of tilt mechanisms, in optical communication with the array of light-emitting transparent pixels and the array of switchable micro-lenses, to steer the light emitted by the array of light-emitting transparent pixels between resolvable angles.

9. The near-eye display of claim 8, wherein the array of switchable micro-lenses is configured to steer light from the array of light-emitting transparent pixels among resolvable spots at a rate of at least 60 Hz.

10. The near-eye display of claim 8, wherein the array of light-emitting transparent pixels comprises a first number of pixels and the array of tilt mechanisms is configured to steer the light among the resolvable angles fast enough for the array of switchable lenses to form the virtual image with a second number of pixels greater than the first number of pixels.

11. The near-eye display of claim 8, wherein the polarization adjuster is a first polarization adjuster and the array of tilt mechanisms comprises:

a second polarization adjuster to switch the light from a corresponding transparent light-emitting pixels in the array of transparent light-emitting pixels between the first polarization state and the second polarization state at a rate of at least 60 Hz; and a polarization-selective beam director, in optical communication with the polarization adjuster, to direct the light in the first polarization state in a first direction and to direct the light in the second polarization state in a second direction.

12. The near-eye display of claim 11, wherein the polarization-selective beam director is a static polarization-selective beam director.

13. The near-eye display of claim 11, wherein the polarization-selective beam director is a dynamic polarization-selective beam director comprising birefringent liquid crystal material actuated by a voltage supply.

14. The near-eye display of claim 1, further comprising:
an array of fixed micro-lenses, in optical communication with the array of switchable micro-lenses, to focus the light.

15. A method of operating a near-eye display comprising an array of light-emitting transparent pixels in optical communication with an array of switchable micro-lenses, the array of switchable micro-lenses comprising a polarization adjuster and a liquid-crystal lens that focuses light in a first polarization state and transmits light in a second polarization state, the method comprising:

emitting light from the array of light-emitting transparent pixels toward an eye of a person wearing the near-eye display;

transmitting ambient light through the array of light-emitting transparent pixels toward the eye of the person wearing the near-eye display; and switching the array of switchable micro-lenses between a focusing state in which the array of switchable micro-lenses focuses the light so as to form a virtual image as perceived by a person wearing the near-eye display and a non-focusing state in which the array of switchable micro-lenses does not focus the light by:

switching the polarization adjuster between a first state in which the polarization adjuster switches the light from the first polarization state to the second polarization state and a second state in which the light in the first polarization state propagates through the polarization adjuster without changing polarization state.

16. The method of claim 15, wherein switching the array of switchable micro-lenses between the focusing state and the non-focusing state comprises switching the polarization adjuster between the first state and the second state at a rate of at least 60 Hz.

17. The method of claim 16, wherein switching the array of switchable micro-lenses between the focusing state and the non-focusing state further comprises:

focusing the light to a focal point when the light is in the first polarization state; and transmitting the light without focusing the light to the focal point when the light is in the second polarization state.

18. The method of claim 17, further comprising:
switching the polarization adjuster between the first state and the second state faster than the liquid-crystal lens changes state.

19. The method of claim 17, wherein emitting the light from the array of light-emitting transparent pixels comprises emitting the light in the first polarization state.

20. The method of claim 15, further comprising:
steering the light emitted by the array of light-emitting transparent pixels between resolvable angles at a rate of at least 60 Hz.

21. The method of claim 15, wherein the array of light-emitting transparent pixels comprises a first number of pixels and further comprising:

steering the light emitted by the array of light-emitting transparent pixels to form the virtual image with a second number of pixels greater than the first number of pixels.

22. A near-eye display comprising:
- an array of light-emitting transparent pixels, having a first number of pixels, to transmit ambient light and to emit light in a first polarization state toward an eye of a person wearing the near-eye display;
- a liquid-crystal polarization adjuster, in optical communication with the array of light-emitting transparent pixels, having a liquid-crystal layer thin enough to switch the light between the first polarization state and a second polarization state at a rate of at least 60 Hz;
- an array of polarization-selective liquid-crystal tilt mechanisms, in optical communication with the liquid-crystal polarization adjuster and having respective liquid-crystal layers thicker than the liquid-crystal layer of the liquid-crystal polarization adjuster, to direct the light in the first polarization state in first directions and to direct the light in the second polarization state in second directions; and
- an array of switchable micro-lenses, in optical communication with the array of light-emitting transparent pixels, to focus the light in the first polarization state and the light in the second polarization state so as to form a virtual image having a second number of pixels greater than the first number of pixels as perceived by the person wearing the near-eye display.

* * * * *